US011616601B2

(12) United States Patent
Lin

(10) Patent No.: US 11,616,601 B2
(45) Date of Patent: *Mar. 28, 2023

(54) INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/378,614

(22) Filed: Jul. 16, 2021

(65) Prior Publication Data

US 2021/0344445 A1 Nov. 4, 2021

Related U.S. Application Data

(63) Continuation of application No. 16/607,060, filed as application No. PCT/CN2017/081731 on Apr. 24, 2017, now Pat. No. 11,101,931.

(51) Int. Cl.
*H04W 4/00* (2018.01)
*H04L 1/06* (2006.01)
(Continued)

(52) U.S. Cl.
CPC .......... *H04L 1/0643* (2013.01); *H04L 1/0675* (2013.01); *H04L 1/1642* (2013.01); *H04W 72/0413* (2013.01)

(58) Field of Classification Search
CPC ... H04L 1/0643; H04L 1/0675; H04L 1/1642; H04L 1/1861; H04L 5/0053;
(Continued)

(56) References Cited

U.S. PATENT DOCUMENTS 11,101,931 B2 * 8/2021 Lin .................. H04L 1/1642
2006/0280200 A1 * 12/2006 Lane ............... H04W 56/0045
370/458
(Continued)

FOREIGN PATENT DOCUMENTS

CN 1559110 A 12/2004
CN 101296021 A 10/2008
(Continued)

OTHER PUBLICATIONS

First Office Action of the Taiwanese application No. 107113265, dated Sep. 29, 2021.
(Continued)

*Primary Examiner* — Atique Ahmed
(74) *Attorney, Agent, or Firm* — Ladas & Parry, LLP

(57) ABSTRACT

Provided are an information transmission method, a terminal device and a network device. The method includes that: a terminal device acquires a first sequence, the first sequence being used for determining a sequence carrying feedback information for downlink data; the terminal device determines target feedback information for target downlink data sent by a network device according to the target downlink data; the terminal device determines a second sequence carrying the target feedback information according to the first sequence; and the terminal device sends the second sequence to the network device. Therefore, the terminal device may efficiently acquire a sequence configured to carry uplink control information.

20 Claims, 4 Drawing Sheets

(51) Int. Cl.
*H04L 1/1607* (2023.01)
*H04W 72/04* (2023.01)

(58) Field of Classification Search
CPC .............. H04L 5/0091; H04W 72/0413; H04W 28/04; H04W 72/1284
See application file for complete search history.

(56) References Cited

U.S. PATENT DOCUMENTS

| | | |
|---|---|---|
| 2009/0042558 A1 | 2/2009 | Shen |
| 2009/0060004 A1 | 3/2009 | Papasakellariou |
| 2009/0290538 A1 | 11/2009 | Kim |
| 2010/0177804 A1 | 7/2010 | Kwak |
| 2011/0051621 A1 | 3/2011 | Kwak |
| 2011/0176443 A1* | 7/2011 | Astely ............... H04L 1/009 370/252 |
| 2011/0243066 A1 | 10/2011 | Nayeb Nazar |
| 2012/0106476 A1 | 5/2012 | Han |
| 2012/0243497 A1 | 9/2012 | Chung |
| 2012/0281567 A1* | 11/2012 | Gao ................. H04L 5/0057 370/252 |
| 2013/0083751 A1 | 4/2013 | Papasakellariou et al. |
| 2013/0148612 A1 | 6/2013 | Kwak et al. |
| 2013/0223389 A1 | 8/2013 | Papasakellariou et al. |
| 2013/0230030 A1 | 9/2013 | Papasakellariou et al. |
| 2013/0272151 A1* | 10/2013 | Thomas ............. H04L 5/0091 370/252 |
| 2013/0286959 A1* | 10/2013 | Lou ................. H04L 27/2602 370/329 |
| 2014/0056280 A1 | 2/2014 | Chen |
| 2014/0241298 A1 | 8/2014 | Park et al. |
| 2014/0301324 A1* | 10/2014 | Cheng ............... H04L 5/0055 370/329 |
| 2014/0307661 A1 | 10/2014 | Wu et al. |
| 2015/0023312 A1 | 1/2015 | Kwak et al. |
| 2015/0071262 A1* | 3/2015 | Doppler ............... H04W 72/12 370/336 |
| 2015/0131564 A1 | 5/2015 | Seo et al. |
| 2015/0156763 A1 | 6/2015 | Seo et al. |
| 2015/0358107 A1 | 12/2015 | Papasakellariou et al. |
| 2017/0117995 A1 | 4/2017 | Papasakellariou et al. |
| 2017/0331577 A1 | 11/2017 | Parkvall et al. |
| 2018/0302198 A1 | 10/2018 | Wang et al. |

FOREIGN PATENT DOCUMENTS

| | | |
|---|---|---|
| CN | 101621361 A | 1/2010 |
| CN | 101959303 A | 1/2011 |
| CN | 102714565 A | 10/2012 |
| CN | 102761355 A | 10/2012 |
| CN | 102882629 A | 1/2013 |
| CN | 103139916 A | 6/2013 |
| CN | 104468030 A | 3/2015 |
| JP | 2011530950 A | 12/2011 |
| JP | 2013540394 A | 10/2013 |
| RU | 2432685 C1 | 10/2011 |
| TW | 201215025 A | 4/2012 |
| WO | 2008147131 A1 | 12/2008 |

OTHER PUBLICATIONS

Supplementary European Search Report in the European application No. 21186054.9, dated Oct. 11, 2021.
First Office Action of the Israeli application No. 270062, dated Dec. 27, 2021.
First Office Action of the Indonesian application No. P00201910810, dated Feb. 11, 2022.
First Office Action of the Australian application No. 2017411422, dated Mar. 1, 2022.
International Search Report in the international application No. PCT/CN2017/081731, dated Jan. 19, 2018.
Written Opinion of the International Search Authority in the international application No. PCT/CN2017/081731, dated Jan. 19, 2018.
Motorola Mobility et al: "Short PUCCH for small payload size", 3GPP Draft; R1-1705553, 3rd Generation Partnership Project (3GPP), Mobile Competence Centre; 650, Route Des Lucioles; F-06921 Sophia-Antipolis Cedex; France, vol. RAN WG1, No. Spokane, USA, Apr. 3, 2017-Apr. 7, 2017 Apr. 2, 2017 (Apr. 2, 2017), XP051243681, entire document.
Qualcomm Incorporated: "Uplink Control Channel Design for Shortened TTI", 3GPP Draft; R1-1611639 Uplink Control Channel Design for Shortened TTI , 3rd Generation Partnershi P Project (3GPP), Mobile Competence Centre; 650, Route Des Lucioles; F-06921 Sophia-Antipolis Cedex; vol. RAN WG1, No. Reno, USA; Nov. 14, 2016-Nov. 18, 2016 Nov. 5, 2016 (Nov. 5, 2016), XP051190045, entire document.
ZTE et al : "NR PUCCH structure in short duration", 3GPP Draft; R1-1701590, 3rd Generation Partnership Project (3GPP), Mobile Competence Centre; 650, Route Des Lucioles; F-06921 Sophia-Anti Polis Cedex; France, vol. RAN WG1 , No. Athens, Greece; Feb. 13, 2017-Feb. 17, 2017 Feb. 12, 2017 (Feb. 12, 2017), XP051208757, entire document.
Supplementary European Search Report in the European application No. 17907311.9, dated Mar. 4, 2020.
CATT; "Short duration PUCCH structure", 3GPP TSG RAN WG1 Meeting #88bis, R1-1706159 Spokane, USA Apr. 3-7, 2017, entire document.
NTT Docomo, Inc. "DMRS-based vs. Sequence-based PUCCH in short duration", 3GPP TSG RAN WG1 Meeting #88, R1-1702811 Athens, Greece, Feb. 13-17, 2017, entire document.
First Office Action of the Russian application No. 2019136432, dated Jul. 16, 2020.
First Office Action of the European application No. 17907311.9, dated Oct. 29, 2020.
Qualcomm Incorporated, "Channelization of short PUCCH", 3GPP TSG RAN WG1 Meeting #88bis R1-1705610, Apr. 7, 2017 (Apr. 7, 2017), entire document.
First Office Action of the Chinese application No. 201911304983.7, dated Nov. 3, 2020.
First Office Action of the Canadian application No. 3061159, dated Dec. 2, 2020.
First Office Action of the Chilean application No. 201903038, dated Dec. 18, 2020.
Office Action of the Indian application No. 201917044730, dated Feb. 22, 2021.
Written Opinion of the Singaporean application No. 11201909848U, dated Mar. 17, 2021.
Second Office Action of the Chilean application No. 201903038, dated Feb. 16, 2021.
MediaTek Inc., "Discussion on UL control channel structures with short duration", 3GPP TSG RAN WG1 NR Ad-Hoc Meeting R1-1700173, Spokane, USA, Jan. 16-20, 2017, entire document.
First Office Action of the Japanese application No. 2019-557578, dated May 7, 2021.
First Office Action of the Korean application No. 10-2019-7032063, dated May 25, 2021.
First Office Action of the U.S. Appl. No. 16/607,060, dated Nov. 3, 2020.
Notice of Allowance of the U.S. Appl. No. 16/607,060, dated Apr. 14, 2021.
Corrected Notice of Allowance of the U.S. Appl. No. 16/607,060, dated May 20, 2021.
First Office Action of the Mexican application No. MX/a/2019/012655, dated Nov. 15, 2022.

* cited by examiner

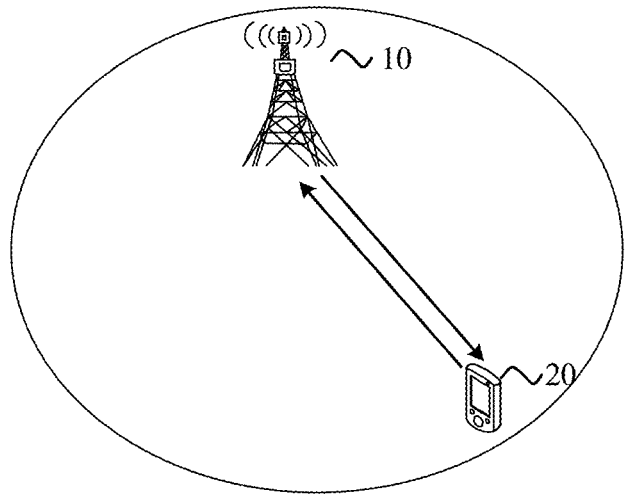

| A terminal device acquires a first sequence, the first sequence being configured to determine a sequence carrying feedback information for downlink data | ~ 210 |

| The terminal device determines target feedback information for target downlink data according to the target downlink data sent by a network device | ~ 220 |

| The terminal device determines a second sequence carrying the target feedback information according to the first sequence | ~ 230 |

| The terminal device sends the second sequence to the network device | ~ 240 |

FIG. 2

A terminal device determines other sequences, except a first sequence, from multiple sequences according to the first sequence, the multiple sequences and multiple types of feedback information meeting a first mapping relationship ~ 231

The terminal device determines a second sequence corresponding to target feedback information in the multiple sequences according to the target feedback information and the first mapping relationship ~ 232

FIG. 3

A terminal device determines a target offset value corresponding to target feedback information from multiple offset values according to the target feedback information and a second mapping relationship, the second mapping relationship representing a corresponding relationship between the multiple offset values and multiple types of feedback information ~ 233

The terminal device determines a second sequence according to a first sequence and the target offset value ~ 234

A network device sends sequence indication information to a terminal device, the sequence indication information being used to indicate a first sequence and the first sequence being used to acquire a sequence carrying feedback information for downlink data ~ 510

The network device sends target downlink data to the terminal device ~ 520

The network device receives a second sequence sent by the terminal device according to the first sequence, the second sequence carrying target feedback information for the target downlink data ~ 530

FIG. 5

INFORMATION TRANSMISSION METHOD, TERMINAL DEVICE, AND NETWORK DEVICE

CROSS-REFERENCE TO RELATED APPLICATIONS

This application is a continuation application of U.S. patent application Ser. No. 16/607,060 filed on Oct. 21, 2019, which is the U.S. national stage of PCT Application No. PCT/CN2017/081731, filed on Apr. 24, 2017 and titled with INFORMATION TRANSMISSION METHOD, TERMINAL DEVICE, AND NETWORK DEVICE, the contents of which are hereby incorporated by reference in their entireties.

TECHNICAL FIELD

Embodiments of the application relate to the field of communication, and more particularly to an information transmission method, a terminal device and a network device.

BACKGROUND

In a 5th-Generation (5G) system, or called New Radio (NR), two types of Physical Uplink Control Channels (PUCCHs) with different lengths are supported, i.e., short-PUCCHs and long-PUCCHs. A short-PUCCH occupies one or two time-domain symbols, and a long-PUCCH occupies at least four time-domain symbols. When a short-PUCCH is adopted to transmit 1-bit or 2-bit uplink control information, different uplink control information may be transmitted by use of different sequences. A terminal device is required to select a sequence according to uplink control information that is practically fed back and transmit the sequence, and thus the terminal device is required to efficiently acquire the sequence configured to carry the uplink control information.

SUMMARY

The embodiments of the application provide an information transmission method, a terminal device and a network device. The terminal device may efficiently acquire a sequence configured to carry uplink control information.

A first aspect provides a method for information transmission, which is implemented by a terminal device and may include: determining a first sequence number; determining a first offset value based on a mapping relationship and feedback information for downlink data, wherein the mapping relationship represents corresponding relationships between multiple offset values and multiple types of feedback information; and sending a sequence carrying the feedback information for the downlink data, wherein the sequence is determined based on the first offset value and the first sequence number.

A second aspect provides a method for information transmission, which is implemented by a network device and may include: receiving a sequence from a terminal device, wherein the sequence carries feedback information for downlink data and the sequence is determined based on a first offset value and a first sequence number, wherein the first sequence number is determined by the terminal device, the first offset value is determined by the terminal device based on a mapping relationship and the feedback information for the downlink data, wherein the mapping relationship represents corresponding relationships between multiple offset values and multiple types of feedback information.

A third aspect provides a terminal device, which includes a processor and a transceiver. Herein, the processor and the transceiver may communicate with one another through an internal connecting path. The processor is configured to implement the method in the first aspect.

A fourth aspect provides a network device, which includes a processor and a transceiver. Herein, the processor and the transceiver may communicate with one another through an internal connecting path. The processor is configured to implement the method in the second aspect, a transceiver and a memory. Herein, the processor, the transceiver and the memory may communicate with one another through an internal connecting path. The memory is configured to store an instruction, and the processor is configured to execute the instruction stored in the memory. When the processor executes the instruction stored in the memory, such execution enables the network device to execute the method in the second aspect or any possible implementation of the second aspect, or such execution enables the network device to implement the network device provided in the fourth aspect.

BRIEF DESCRIPTION OF DRAWINGS

FIG. 1 is a schematic architecture diagram of an application scenario according to an embodiment of the application.

FIG. 2 is a schematic flowchart of an information transmission method according to an embodiment of the application.

FIG. 3 is a schematic flowchart of an information transmission method according to an embodiment of the application.

FIG. 4 is a schematic flowchart of an information transmission method according to an embodiment of the application.

FIG. 5 is a schematic flowchart of an information transmission method according to an embodiment of the application.

DETAILED DESCRIPTION

Figure 6:
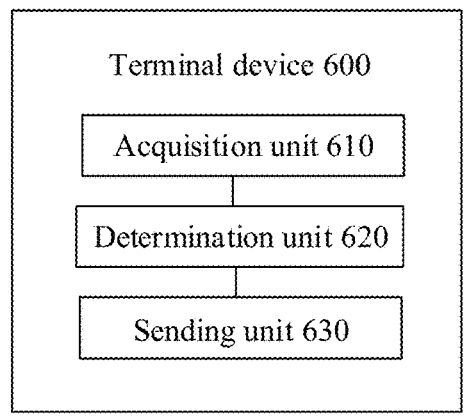
FIG. 6 is a schematic block diagram of a terminal device according to an embodiment of the application.

The technical solutions in the embodiments of the application will be described below in combination with the drawings.

It is to be understood that the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a Long Term Evolution (LTE) system, an LTE Frequency Division Duplex (FDD) system, LTE Time Division Duplex (TDD), a Universal Mobile Telecommunication System (UMTS) and a future 5G communication system.

Each embodiment of the application is described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a future 5G network, a terminal device in a future evolved Public Land Mobile Network (PLMN) or the like.

Each embodiment of the application is described in combination with a network device. The network device may be a device configured to communicate with the terminal device. The network device for example, may be a Base Transceiver Station (BTS) in GSM or CDMA, may also be a NodeB (NB) in a WCDMA system, or may also be an Evolutional Node B (eNB or eNodeB) in an LTE system. Or the network device may be a relay station, an access point, a vehicle-mounted device, a wearable device, a network-side device in a future 5G network, a network-side device in a future evolved PLMN or the like.

FIG. 1 is a schematic diagram of an application scenario according to an embodiment of the application. A communication system in FIG. 1 may include a network device 10 and a terminal device 20. The network device 10 is configured to provide communication service for the terminal device 20 for access to a core network. The terminal device 20 may access network by searching for a synchronization signal, broadcast signal and the like sent by the network device 10, thereby communicating with the network. Arrows shown in FIG. 1 may represent uplink/downlink transmission implemented through a cellular link between the terminal device 20 and the network device 10.

A network in the embodiments of the application may refer to a Public Land Mobile Network (PLMN) or a Device to Device (D2D) network or a Machine to Machine/Man (M2M) network or other networks. FIG. 1 is only an exemplary simplified schematic diagram. The network may further include other terminal devices which are not presented in FIG. 1.

FIG. 2 is a schematic flowchart of an information transmission method 200 according to an embodiment of the application. The information transmission method in FIG. 2 may be executed by a terminal device, for example, the terminal device 20 shown in FIG. 1. As shown in FIG. 2, a specific flow for information transmission includes the following operations.

In the operation 210, the terminal device acquires a first sequence.

The first sequence is configured to determine a sequence carrying feedback information for downlink data.

Specifically, the terminal device may generate different feedback information for different downlink data. Different feedback information may be carried in different transmission sequences (called sequences for short in the embodiment of the application) so as to be sent to a network device. The first sequence is equivalently a basic sequence in these sequences, and all of the other sequences may be determined according to the basic sequence.

The network device may explicitly or implicitly indicate the first sequence to the terminal device. The operation that the terminal device acquires the first sequence includes that: the terminal device receives sequence indication information sent by the network device, the sequence indication information being used for explicitly or implicitly indicating the first sequence.

For example, the sequence indication information directly indicates a serial number of the first sequence.

For another example, the operation that the terminal device acquires the first sequence includes that: the terminal device receives the sequence indication information sent by the network device; and the terminal device determines the first sequence corresponding to a physical resource according to the physical resource configured to receive the sequence indication information. That is, the network device implicitly indicates the first sequence through information such as a resource position or size of the physical resource for the sequence indication information.

In the operation 220, the terminal device determines target feedback information for target downlink data according to the target downlink data sent by the network device.

The target feedback information may include, for example, at least one Acknowledgement (ACK) and/or at least one Negative Acknowledgement (NACK).

In the operation 230, the terminal device determines a second sequence carrying the target feedback information according to the first sequence.

Specifically, the terminal device, after determining the target feedback information for the target downlink data, may determine the second sequence corresponding to the target feedback information and configured to carry the target feedback information according to the first sequence. Optionally, a serial number of the second sequence may be obtained on the basis of the serial number of the first sequence.

Two manners for determining the second sequence are provided in the embodiments of the application, and will be described below respectively.

Manner 1

Optionally, as shown in FIG. 3, the operation that the terminal device determines the second sequence carrying the target feedback information according to the first sequence, namely the operation 230 in FIG. 2, may include operations 231 and 232.

In the operation 231, the terminal device determines other sequences than the first sequence from multiple sequences according to the first sequence, the multiple sequences and multiple types of feedback information meeting a first mapping relationship.

In the operation 232, the terminal device determines the second sequence corresponding to the target feedback information in the multiple sequences according to the target feedback information and the first mapping relationship.

The multiple sequences include the second sequence and the first sequence, and the second sequence may be a sequence the same as the first sequence, or may also be another sequence acquired on the basis of the first sequence in the multiple sequences.

That is, the terminal device determines the other sequences in the multiple sequences according to the first sequence, the multiple sequences and the multiple types of feedback information meet the first mapping relationship, the first mapping relationship represents corresponding relationships between the multiple sequences and the multiple types of feedback information, and the corresponding relationship may be represented by, for example, a table, a formula, an image and the like. That is, the terminal device may search a preset table including the corresponding relationships between the multiple sequences and the multiple types of feedback information to determine the second sequence corresponding to the target feedback information; or the terminal device may also calculate an identifier or serial number of the second sequence corresponding to the target feedback information through a preset formula and a parameter related to the target feedback information. There are no limits made thereto in the application. The terminal device may determine the second sequence corresponding to the target feedback information according to the target feedback information for the target downlink data and the first mapping relationship.

In the embodiment, the terminal device determines the multiple sequences in advance so as to directly select the sequence configured to carry the target feedback information in the multiple sequences according to the target feedback information during subsequent transmission, and is not required to calculate the sequence every time.

Optionally, the first mapping relationship may be configured for the terminal device by the network device. Before the terminal device determines the other sequences than the first sequence in the multiple sequences according to the first sequence, the terminal device receives second configuration information sent by the network device, the second configuration information including the first mapping relationship. Or, the first mapping relationship is predefined by the terminal device and the network device, for example, specified in a protocol.

Optionally, the number of multiple sequences is determined according to a transmission parameter, and the transmission parameter includes any one of: the number of a TB in the target downlink data; the number of a code block group in the target downlink data; a product of the number of the TB and the number of the code block group in the target downlink data; and a maximum bit number of the target feedback information.

Optionally, before the operation that the terminal device determines the other sequences than the first sequence in the multiple sequences according to the first sequence, the method further includes that: the terminal device receives the transmission parameter sent by the network device.

Optionally, if a value of the transmission parameter is n, the number of the multiple sequences may be $2^n$, n being a positive integer.

For example, if the transmission parameter is the number of the TB in the target downlink data and the number of the TB is n=1, there are two sequences configured to carry the feedback information, one being configured to carry an ACK and the other being configured to carry a NACK; and if the number of the TB is n=2, there are $2^2=4$ sequences configured to carry the feedback information, and the 4 sequences are configured to carry an ACK and an ACK, an ACK and a NACK (the ACK is transmitted before the NACK), a NACK and an ACK (the NACK is transmitted before the ACK), and a NACK and a NACK respectively.

Each sequence in the multiple sequences corresponds to an offset value, and a difference between a serial number of each sequence and the serial number of the first sequence is the offset value corresponding to the each sequence. For example, the serial number of each sequence in the other sequences than the first sequence in the multiple sequences is equal to a sum of the serial number of the first sequence and the offset value corresponding to the each sequence. Optionally, these sequences with different serial numbers may be a series of sequences generated by cyclic shift of the basic sequence.

Optionally, before the operation that the terminal device determines the other sequences than the first sequence in the multiple sequences according to the first sequence, the method further includes that: the terminal device receives first configuration information sent by the network device, the first configuration information including the offset value corresponding to each sequence. Or, the offset value is predefined by the terminal device and the network device, for example, specified in a protocol.

For example, according to the first mapping relationship shown in Table 1, if the number of the TB in the target downlink data is n=1, the total number of the sequences is 2. Table 1 shows the first mapping relationship in case of n=1. When the feedback information includes an ACK, the feedback information is carried in a sequence $S_i$; and when the feedback information includes a NACK, the feedback information is carried in a sequence $S_i+\Delta_{offset,0}$.

TABLE 1

| Feedback information | Resource serial number of transmission sequence |
|---|---|
| ACK | $S_i$ |
| NACK | $S_i + \Delta_{offset,0}$ |

The terminal device, after receiving the sequence indication information sent by the network device, acquires the serial number $S_i$ of the first sequence and the number n=1 of the TBs carried in the target downlink data. The terminal device determines the multiple sequences according to the first sequence and the offset value corresponding to each sequence in the multiple sequences in Table 1. The terminal device decodes the TBs, determines a target feedback result for the target downlink data and determines the sequence corresponding to the target feedback result and configured to carry the target feedback result in the multiple sequences according to the first mapping relationship shown in Table 1. If the target feedback result includes an ACK, the terminal device sends the sequence $S_i$ to the network device; and if the target feedback result includes a NACK, the terminal device sends the sequence $S_i+\Delta_{offset,0}$ to the network device, the offset value $\Delta_{offset,0}$ being, for example, 1.

For another example, according to the first mapping relationship shown in Table 2, if the maximum bit number of the target feedback information is n=2, the total number of the sequences is 4. Table 2 shows the first mapping relationship in case of n=2. When the feedback information includes an ACK and an ACK, the feedback information is carried in the sequence $S_i$; when the feedback information includes an ACK and a NACK, the feedback information is carried in the sequence $S_i+\Delta_{offset,0}$; when the feedback information includes a NACK and an NACK, the feedback information is carried in a sequence $S_i+\Delta_{offset,1}$; and when the feedback information includes a NACK and a NACK, the feedback information is carried in a sequence $S_i+\Delta_{offset,2}$.

TABLE 2

| Feedback information | Resource serial number of transmission sequence |
|---|---|
| ACK, ACK | $S_i$ |
| ACK, NACK | $S_i + \Delta_{offset,0}$ |
| NACK, ACK | $S_i + \Delta_{offset,1}$ |
| NACK, NACK | $S_i + \Delta_{offset,2}$ |

The terminal device, after receiving the sequence indication information sent by the network device, acquires the serial number $S_i$ of the first sequence. The terminal device determines the multiple sequences according to the first sequence and the offset value corresponding to each sequence in the multiple sequences in Table 2. The terminal device determines the target feedback result for the target downlink data and determines the sequence corresponding to the target feedback result and configured to carry the target feedback result in the multiple sequences according to the first mapping relationship shown in Table 2. If the feedback result includes an ACK and an ACK, the terminal device sends the sequence $S_i$ to the network device; if the feedback result includes an ACK and a NACK, the terminal device sends the sequence $S_i+\Delta_{offset,0}$ to the network device; if the feedback result includes a NACK and an ACK, the terminal device sends the sequence $S_i+\Delta_{offset,1}$ to the network device; and if the feedback result includes a NACK and a NACK, the terminal device sends the sequence $S_i+\Delta_{offset,2}$ to the network device. The offset values may be $\Delta_{offset,0}=1$, $\Delta_{offset,1}=2$ and $\Delta_{offset,2}=3$.

Manner 2

Optionally, as shown in FIG. 4, the operation that the terminal device determines the second sequence carrying the target feedback information according to the first sequence, namely the operation 230 in FIG. 2 may include operations 233 and 234.

In the operation 233, the terminal device determines a target offset value corresponding to the target feedback information from multiple offset values according to the target feedback information and a second mapping relationship, the second mapping relationship representing corresponding relationships between the multiple offset values and the multiple types of feedback information.

In the operation 234, the terminal device determines the second sequence according to the first sequence and the target offset value.

The second sequence may be a sequence the same as the first sequence (the target offset value is 0), or may also be another sequence acquired on the basis of a respectively corresponding offset value and the first sequence.

That is, the terminal device may determine the target offset value corresponding to the target feedback information in the multiple offset values at first according to the target feedback information and the second mapping relationship. The second mapping relationship represents the corresponding relationships between the multiple offset values and the multiple types of feedback information, and the corresponding relationship may be represented by, for example, a table, a formula, an image and the like. That is, the terminal device may search a preset table including the corresponding relationships between the multiple offset values and the multiple types of feedback information to determine the target offset value corresponding to the target feedback information; or the terminal device may also calculate the target offset value corresponding to the target feedback information through a preset formula and a parameter related to the target feedback information. There are no limits made thereto in the application. Secondly, the terminal device determines the second sequence carrying the target feedback information according to the first sequence and the target offset value. For example, the serial number of the second sequence is equal to a sum of the serial number of the first sequence and the target offset value.

In the embodiment, the terminal device determines the offset value corresponding to the target feedback information so as to directly calculate the sequence configured to carry the target feedback information according to the first sequence and the offset value, and is not required to determine the multiple sequences in advance in the first manner.

Optionally, the number of the multiple offset values is determined according to a transmission parameter, and the transmission parameter includes any one of: the number of the TB in the target downlink data; the number of the code block group in the target downlink data; the product of the number of the TB and the number of the code block group in the target downlink data; and the maximum bit number of the target feedback information.

Optionally, if a value of the transmission parameter is n, the number of multiple offset values may be $2^n$, n being a positive integer.

Optionally, before the terminal device determines the multiple offset values, the method further includes that: the terminal device receives the transmission parameter sent by the network device.

Optionally, before the operation that the terminal device determines the target offset value corresponding to the target feedback information in the multiple offset values according to the target feedback information and the second mapping relationship, the method further includes that: the terminal device receives third configuration information sent by the network device, the third configuration information including the second mapping relationship.

Optionally, the second mapping relationship is predefined by the terminal device and the network device, for example, specified in a protocol.

For example, according to the second mapping relationship shown in Table 3, if the number of the TB in the target downlink data is n=1, the number of the offset values is 2. Table 3 shows the second mapping relationship in case of n=1. When the feedback information includes an ACK, the offset value is $\Delta_{offset,0}$; and when the feedback information includes a NACK, the offset value is $\Delta_{offset,1}$.

TABLE 3

| Feedback information | Offset value |
| --- | --- |
| ACK | $\Delta_{offset,0}$ |
| NACK | $\Delta_{offset,1}$ |

The terminal device, after receiving the sequence indication information sent by the network device, acquires the serial number $S_i$ of the first sequence and the number n=1 of the TBs carried in the target downlink data. The terminal device decodes the TBs, determines the target feedback result for the target downlink data and determines the target offset value corresponding to the target feedback result according to the second mapping relationship shown in Table 3. If the target feedback result includes an ACK, the corresponding target offset value is $\Delta_{offset,0}$; and if the target feedback result includes a NACK, the corresponding target offset value is $\Delta_{offset,1}$. For example, the offset value $\Delta_{offset,0}$ may be 0 and $\Delta_{offset,1}$ may be 1. Then, the terminal device adds the serial number of the first sequence to the target offset value to obtain the serial number of the second sequence carrying the target feedback result, and sends the second sequence to the network device.

For another example, according to the second mapping relationship shown in Table 4, if the maximum bit number of the target feedback information is n=2, the number of the offset values is 4. Table 4 shows the second mapping relationship in case of n=2. When the feedback information includes an ACK and an ACK, the offset value is $\Delta_{offset,0}$; when the feedback information includes an ACK and a NACK, the offset value is $\Delta_{offset,1}$; when the feedback information includes a NACK and an ACK, the offset value is $\Delta_{offset,2}$; and when the feedback information includes a NACK and a NACK, the offset value is $\Delta_{offset,3}$.

TABLE 4

| Feedback information | Offset value |
|---|---|
| ACK, ACK | $\Delta_{offset,0}$ |
| ACK, NACK | $\Delta_{offset,1}$ |
| NACK, ACK | $\Delta_{offset,2}$ |
| NACK, NACK | $\Delta_{offset,3}$ |

The terminal device, after receiving the sequence indication information sent by the network device, acquires the serial number $S_i$ of the first sequence. The terminal device determines the target feedback result for the target downlink data and determines the target offset value corresponding to the target feedback result according to the second mapping relationship shown in Table 4. If the target feedback result includes an ACK and an ACK, the corresponding target offset value is $\Delta_{offset,0}$; if the target feedback result includes an ACK and a NACK, the corresponding target offset value is $\Delta_{offset,1}$; if the feedback result includes a NACK and an ACK, the corresponding target offset value is $\Delta_{offset,2}$; and if the feedback result includes a NACK and a NACK, the corresponding target offset value is $\Delta_{offset,3}$. The offset values may be $\Delta_{offset,0}=0$, $\Delta_{offset,1}=1$, $\Delta_{offset,2}=2$ and $\Delta_{offset,3=3}$. Then, the terminal device adds the serial number of the first sequence to the target offset value to obtain the serial number of the second sequence carrying the target feedback result, and sends the second sequence to the network device.

In 240, the terminal device sends the second sequence to the network device.

FIG. 5 is a schematic flowchart of an information transmission method 500 according to an embodiment of the application. The information transmission method in FIG. 5 may be executed by a network device, for example, the network device 10 shown in FIG. 1. As shown in FIG. 5, a specific flow for information transmission includes the following operations.

In 510, the network device sends sequence indication information to a terminal device, the sequence indication information being used to indicate a first sequence.

The first sequence is configured to acquire a sequence carrying feedback information for downlink data.

In 520, the network device sends target downlink data to the terminal device.

In 530, the network device receives a second sequence sent by the terminal device according to the first sequence, the second sequence carrying target feedback information for the target downlink data.

Specifically, the first sequence sent to the terminal device by the network device is configured for the terminal device to determine the sequence configured to carry the feedback information for the downlink data. A specific process that the terminal device, after the network device sends the target downlink data to the terminal device, determines the second sequence carrying the target feedback information for the target downlink data according to the first sequence may refer to descriptions about 210- to 240 in FIG. 2 to FIG. 4 and will not be elaborated herein for simplicity.

In such a manner, the network device indicates the first sequence to the terminal device to enable the terminal device to acquire the second sequence carrying feedback information for present downlink data through the first sequence, so that a sequence configured to carry uplink control information may be efficiently determined.

Optionally, the number of multiple sequences is determined according to a transmission parameter, and the transmission parameter includes any one of: the number of a TB in the target downlink data; the number of a code block group in the target downlink data; a product of the number of the TB and the number of the code block group in the target downlink data; and a maximum bit number of the target feedback information.

Optionally, if a value of the transmission parameter is n, the number of multiple sequences is $2^n$, n being a positive integer.

Optionally, a serial number of each sequence in the other sequences than the first sequence in the multiple sequences is equal to a sum of a serial number of the first sequence and an offset value corresponding to the sequence.

Optionally, before the operation that the network device receives the second sequence sent by the terminal device according to the first sequence, the method further includes that: the network device sends first configuration information to the terminal device, the first configuration information including an offset value corresponding to each sequence. Or, the offset value is predefined by the terminal device and the network device, for example, specified in a protocol.

Optionally, before the operation that the network device receives the second sequence sent by the terminal device according to the first sequence, the method further includes that: the network device sends second configuration information to the terminal device, the second configuration information including a first mapping relationship. Or, the first mapping relationship is predefined by the terminal device and the network device, for example, specified in a protocol.

Optionally, before the operation that the network device receives the second sequence sent by the terminal device according to the first sequence, the method further includes that: the network device sends the transmission parameter to the terminal device.

It is to be understood that, in various embodiments of the application, a serial number of each process does not mean an execution sequence and the execution sequence of each process should be determined by its function and an internal logic and should not form any limit to an implementation process of the embodiments of the application.

FIG. 6 is a schematic block diagram of a terminal device 600 according to an embodiment of the application. As shown in FIG. 6, the terminal device 600 includes an acquisition unit 610, a determination unit 620 and a sending unit 630.

The acquisition unit 610 is configured to acquire a first sequence, the first sequence being used for determining a sequence carrying feedback information for downlink data.

The determination unit 620 is configured to determine target feedback information for target downlink data according to the target downlink data sent by the network device.

The determination unit 620 is further configured to determine a second sequence carrying the target feedback information according to the first sequence acquired by the acquisition unit 610.

The sending unit 630 is configured to send the second sequence determined by the determination unit 620 to the network device.

In such a manner, the terminal device acquires the second sequence carrying feedback information for present downlink data through the first sequence, so that a sequence configured to carry uplink control information may be efficiently determined.

Optionally, the determination unit 620 is specifically configured to: determine other sequences than the first sequence from multiple sequences according to the first sequence, the multiple sequences and multiple types of feedback information meeting a first mapping relationship; and determine, by the terminal device, the second sequence corresponding to the target feedback information in the multiple sequences according to the target feedback information and the first mapping relationship.

Optionally, the number of the multiple sequences is determined according to a transmission parameter, and the transmission parameter includes any one of: the number of a TB in the target downlink data; the number of a code block group in the target downlink data; a product of the number of the TB and the number of the code block group in the target downlink data; and a maximum bit number of the target feedback information.

Optionally, a value of the transmission parameter is n, and the number of multiple sequences is $2^n$, n being a positive integer.

Optionally, the terminal device further includes a receiving unit, and the receiving unit is configured to, before the determination unit 620 determines the other sequences than the first sequence in the multiple sequences according to the first sequence, receive the transmission parameter sent by the network device.

Optionally, a serial number of each sequence in the other sequences than the first sequence in the multiple sequences is equal to a sum of a serial number of the first sequence and an offset value corresponding to the sequence.

Optionally, the terminal device further includes a receiving unit, and the receiving unit is configured to, before the determination unit 620 determines the other sequences than the first sequence in the multiple sequences according to the first sequence, receive first configuration information sent by the network device, the first configuration information including the offset value corresponding to each sequence.

Optionally, the receiving unit is further configured to, before the determination unit 620 determines the other sequences than the first sequence in the multiple sequences according to the first sequence, receive second configuration information sent by the network device, the second configuration information including the first mapping relationship.

Optionally, the first mapping relationship is predefined by the terminal device and the network device.

Optionally, the determination unit 620 is specifically configured to: determine a target offset value corresponding to the target feedback information from multiple offset values according to the target feedback information and a second mapping relationship, the second mapping relationship representing corresponding relationships between the multiple offset values and the multiple types of feedback information; and determine the second sequence according to the first sequence and the target offset value.

Optionally, the number of the multiple offset values is determined according to a transmission parameter, and the transmission parameter includes any one of: the number of the TB in the target downlink data; the number of the code block group in the target downlink data; the product of the number of the TB and the number of the code block group in the target downlink data; and the maximum bit number of the target feedback information.

Optionally, a value of the transmission parameter is n, and the number of the multiple offset values is $2^n$, n being a positive integer.

Optionally, the terminal device further includes a receiving unit, and the receiving unit is configured to, before the determination unit 620 determines the multiple offset values, receive the transmission parameter sent by the network device.

Optionally, the serial number of the second sequence is equal to a sum of the serial number of the first sequence and the target offset value.

Optionally, the receiving unit is further configured to, before the determination unit 620 determines the target offset value corresponding to the target feedback information in the multiple offset values according to the target feedback information and the second mapping relationship, receive third configuration information sent by the network device, the third configuration information including the second mapping relationship.

Optionally, the second mapping relationship is predefined by the terminal device and the network device.

Optionally, the acquisition unit 610 is specifically configured to receive sequence indication information sent by the network device, the sequence indication information being used for explicitly or implicitly indicating the first sequence.

Optionally, the acquisition unit 610 is specifically configured to: receive the sequence indication information sent by the network device; and determine the first sequence corresponding to a physical resource according to the physical resource configured to receive the sequence indication information.

Figure 7:
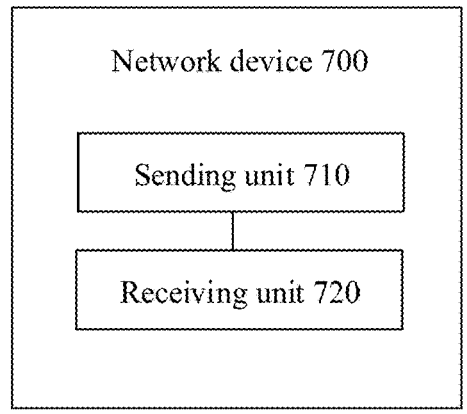
FIG. 7 is a schematic block diagram of a network device according to an embodiment of the application.

FIG. 7 is a schematic block diagram of a network device 700 according to an embodiment of the application. As shown in FIG. 7, the network device 700 includes a sending unit 710 and a receiving unit 720.

The sending unit 710 is configured to send sequence indication information to a terminal device, the sequence indication information being used to indicate a first sequence and the first sequence being used for determining a sequence carrying feedback information for downlink data.

The sending unit 710 is further configured to send target downlink data to the terminal device.

The receiving unit 720 is configured to receive a second sequence sent by the terminal device according to the first sequence, the second sequence carrying target feedback information for the target downlink data.

In such a manner, the network device indicates the first sequence to the terminal device to enable the terminal device to acquire the second sequence carrying feedback information for present downlink data through the first sequence, so that a sequence configured to carry uplink control information may be efficiently determined.

Optionally, the number of multiple sequences is determined according to a transmission parameter, and the transmission parameter includes any one of: the number of a TB in the target downlink data; the number of a code block group in the target downlink data; a product of the number of the TB and the number of the code block group in the target downlink data; and a maximum bit number of the target feedback information.

Optionally, a value of the transmission parameter is n, and the number of the multiple sequences is $2^n$, n being a positive integer.

Optionally, the sending unit 710 is further configured to, before the receiving unit 720 receives the second sequence sent by the terminal device according to the first sequence, send the transmission parameter to the terminal device.

Optionally, a serial number of each sequence in the other sequences than the first sequence in the multiple sequences is equal to a sum of a serial number of the first sequence and an offset value corresponding to the sequence.

Optionally, the sending unit 710 is further configured to, before the receiving unit 720 receives the second sequence sent by the terminal device according to the first sequence, send first configuration information to the terminal device, the first configuration information including the offset value corresponding to each sequence.

Optionally, the sending unit 710 is further configured to, before the receiving unit 720 receives the second sequence sent by the terminal device according to the first sequence, send second configuration information to the terminal device, the second configuration information including a first mapping relationship and the first mapping relationship being configured to represent corresponding relationships between the multiple sequences and multiple types of feedback information.

Optionally, the sending unit 710 is further configured to, before the receiving unit 720 receives the second sequence sent by the terminal device according to the first sequence, send third configuration information to the terminal device, the third configuration information including a second mapping relationship and the second mapping relationship being configured to represent corresponding relationships between multiple offset values and the multiple types of feedback information.

Figure 8:
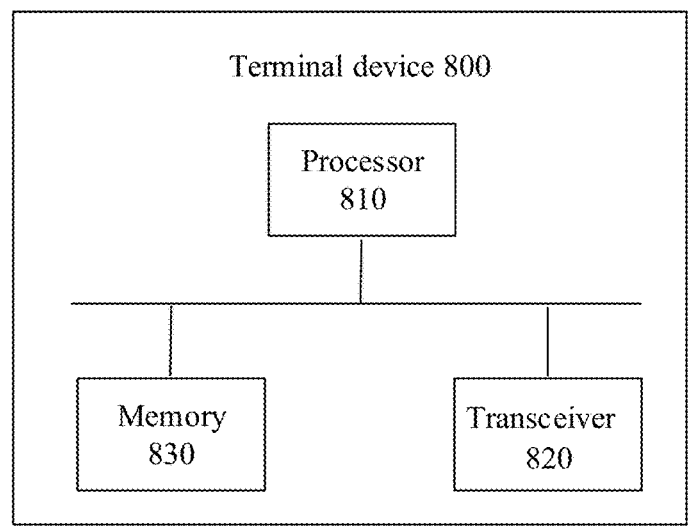
FIG. 8 is a schematic structure diagram of a terminal device according to an embodiment of the application.

FIG. 8 is a schematic structure diagram of a terminal device 800 according to an embodiment of the application. As shown in FIG. 8, the terminal device includes a processor 810, a transceiver 820 and a memory 830. The processor 810, the transceiver 820 and the memory 830 may communicate with one another through an internal connecting path. The memory 830 is configured to store an instruction, and the processor 810 is configured to execute the instruction stored in the memory 830 to control the transceiver 820 to receive a signal or send a signal.

The processor 810 is configured to: acquire a first sequence, the first sequence being used for determining a sequence carrying feedback information for downlink data; determine target feedback information for target downlink data sent by a network device according to the target downlink data; and determine a second sequence carrying the target feedback information according to the first sequence acquired by an acquisition unit.

The transceiver 820 is configured to send the second sequence determined by a determination unit to the network device.

Optionally, the processor 810 may call the program code stored in the memory 830 to execute corresponding operations of the terminal device in the method 200 shown in FIG. 2. For similarity, no more elaborations will be made herein.

It is to be understood that, in the embodiment of the application, the processor 810 may be a Central Processing Unit (CPU), or the processor 810 may also be a universal processor, a Digital Signal Processor (DSP), an Application Specific Integrated Circuit (ASIC), a Field-Programmable Gate Array (FPGA) or other programmable logic device, discrete gate or transistor logic device and discrete hardware component and the like. The universal processor may be a microprocessor or any conventional processor and the like.

The memory 830 may include a Read-Only Memory (ROM) and a Random Access Memory (RAM) and provide an instruction and data for the processor 810. A part of the memory 830 may further include a nonvolatile RAM. For example, the memory 830 may further store information of a device type.

In an implementation process, each step of the method may be completed by an integrated logic circuit of hardware in the processor 810 or an instruction in a software form. The steps of a positioning method disclosed in combination with the embodiments of the application may be directly embodied to be executed and completed by a hardware processor or executed and completed by a combination of hardware and software modules in the processor 810. The software module may be located in a mature storage medium in this field such as a RAM, a flash memory, a ROM, a programmable ROM or electrically erasable programmable ROM and a register. The storage medium is located in the memory 830. The processor 810 reads information in the memory 830 and completes the steps of the method in combination with hardware. No more detailed descriptions will be made herein to avoid repetitions.

The terminal device 800 according to the embodiment of the application may correspond to the terminal device configured to execute the method 200 in the method 200 and the terminal device 500 according to the embodiment of the application, and each unit or module in the terminal device 800 is configured to execute each operation or processing process executed by the terminal device in the method 200. Herein, for avoiding elaborations, detailed descriptions thereof are omitted.

Figure 9:
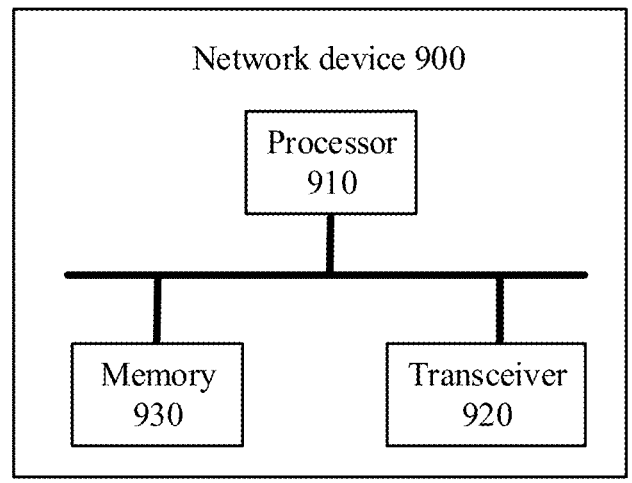
FIG. 9 is a schematic structure diagram of a network device according to an embodiment of the application.

FIG. 9 is a schematic structure diagram of a network device 900 according to an embodiment of the application. As shown in FIG. 9, the network device includes a processor 910, a transceiver 920 and a memory 930. The processor 910, the transceiver 920 and the memory 930 may communicate with one another through an internal connecting path. The memory 930 is configured to store an instruction, and the processor 910 is configured to execute the instruction stored in the memory 930 to control the transceiver 920 to receive a signal or send a signal.

The transceiver 920 is configured to: send sequence indication information to a terminal device, the sequence indication information being used to indicate a first sequence and the first sequence being used for determining a sequence carrying feedback information for downlink data; send target downlink data to the terminal device; and receive a second sequence sent by the terminal device according to the first sequence, the second sequence carrying target feedback information for the target downlink data.

Optionally, the processor 910 may call the program code stored in the memory 930 to execute corresponding operations of the network device in the method 400 shown in FIG. 4. For similarity, no more elaborations will be made herein.

It is to be understood that, in the embodiment of the application, the processor 910 may be a CPU and the processor 910 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 930 may include a ROM and a RAM and provide an instruction and data for the processor 910. A part of the memory 930 may further include a nonvolatile RAM. For example, the memory 930 may further store information of a device type.

In an implementation process, each operation of the method may be completed by an integrated logic circuit of hardware in the processor 910 or an instruction in a software form. The operations of a positioning method disclosed in combination with the embodiments of the application may be directly embodied to be executed and completed by a hardware processor or executed and completed by a combination of hardware and software modules in the processor 910. The software module may be located in a mature storage medium in this field such as a RAM, a flash memory, a ROM, a programmable ROM or electrically erasable programmable ROM and a register. The storage medium is located in the memory 930. The processor 910 reads information in the memory 930 and completes the steps of the method in combination with hardware. No more detailed descriptions will be made herein to avoid repetitions.

The network device 900 according to the embodiment of the application may correspond to the network device configured to execute the method 500 in the method 500 and the network device 700 according to the embodiment of the application, and each unit or module in the network device 900 is configured to execute each operation or processing process executed by the network device in the method 500. For avoiding elaborations, detailed descriptions thereof are omitted.

Figure 10:
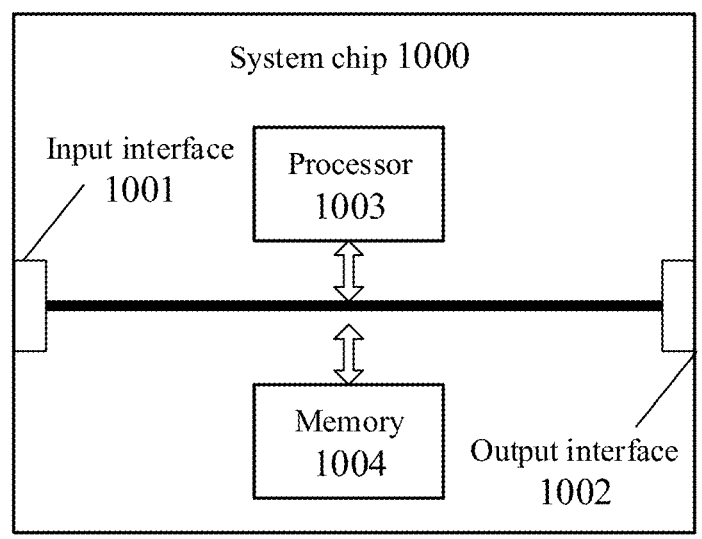
FIG. 10 is a schematic structure diagram of a system chip according to an embodiment of the application.

FIG. 10 is a schematic structure diagram of a system chip according to an embodiment of the application. The system chip 1000 of FIG. 10 includes an input interface 1001, an output interface 1002, at least one processor 1003 and a memory 1004. The input interface 1001, the output interface 1002, the processor 1003 and the memory 1004 are connected with one another through an internal connecting path. The processor 1003 is configured to execute a code in the memory 1004.

Optionally, when the code is executed, the processor 1003 may implement the method 200 executed by a terminal device in the method embodiments. For simplicity, no more elaborations will be made herein.

Optionally, when the code is executed, the processor 1003 may implement the method 500 executed by a network device in the method embodiments. For simplicity, no more elaborations will be made herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the described system, device and method may be implemented in other manners. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The storage medium includes: various media capable of storing program codes such as a U disk, a mobile hard disk, a ROM, a RAM, a magnetic disk or an optical disk.

The above is only the specific implementation of the application and not intended to limit the scope of protection of the embodiments of the application. Any variations or replacements apparent to those skilled in the art within the technical scope disclosed by the embodiments of the application shall fall within the scope of protection of the application. Therefore, the scope of protection of the embodiments of the application shall be subject to the scope of protection of the claims.

The invention claimed is:

1. A method for information transmission, comprising:
   determining, by a terminal device, a first sequence number;
   determining, by the terminal device, a first offset value based on a mapping relationship and feedback information for downlink data, wherein the mapping relationship represents corresponding relationships between multiple offset values and multiple types of feedback information;
   sending, by the terminal device, a sequence carrying the feedback information for the downlink data, wherein the sequence is determined based on the first offset value and the first sequence number.

2. The method of claim 1, wherein the sequence is determined based on a sum of the first offset value and the first sequence number.

3. The method of claim 1, wherein there is a same numerical difference between adjacent offset values in the multiple offset values.

4. The method of claim 1, wherein the amount of the multiple types of feedback information is 2 or 4.

5. The method of claim 1, wherein the first sequence number is determined by the terminal device based on configuration information.

6. A method for information transmission, comprising:
   receiving, by a network device, a sequence from a terminal device, wherein the sequence carries feedback information for downlink data and the sequence is determined based on a first offset value and a first sequence number,
   wherein the first sequence number is determined by the terminal device,
   wherein the first offset value is determined by the terminal device based on a mapping relationship and the feedback information for the downlink data, wherein the mapping relationship represents corresponding relationships between multiple offset values and multiple types of feedback information.

7. The method of claim 6, wherein the sequence is determined based on a sum of the first offset value and the first sequence number.

8. The method of claim 6, wherein there is a same numerical difference between adjacent offset values in the multiple offset values.

9. The method of claim 6, wherein the amount of the multiple types of feedback information is 2 or 4.

10. The method of claim 6, wherein the first sequence number is determined by the terminal device based on configuration information.

11. A network device, comprising:
a processor; and
a transceiver, connected to the processor and configured to send and receive information under control of the processor,
wherein the processor is configured to implement the method of claim 6.

12. The network device of claim 11, wherein the sequence is determined based on a sum of the first offset value and the first sequence number.

13. The network device of claim 11, wherein there is a same numerical difference between adjacent offset values in the multiple offset values.

14. The network device of claim 11, wherein the amount of the multiple types of feedback information is 2 or 4.

15. The network device of claim 11, wherein the first sequence number is determined by the terminal device based on configuration information.

16. A terminal device, comprising:
a processor; and
a transceiver, connected to the processor and configured to send and receive information under control of the processor,
wherein the processor is configured to:
determine a first sequence number; and
determine a first offset value based on a mapping relationship and feedback information for downlink data, wherein the mapping relationship represents corresponding relationships between multiple offset values and multiple types of feedback information; and
the transceiver is configured to send a sequence carrying the feedback information for the downlink data, wherein the sequence is determined based on the first offset value and the first sequence number.

17. The terminal device of claim 16, wherein the sequence is determined based on a sum of the first offset value and the first sequence number.

18. The terminal device of claim 16, wherein there is a same numerical difference between adjacent offset values in the multiple offset values.

19. The terminal device of claim 16, wherein the amount of the multiple types of feedback information is 2 or 4.

20. The terminal device of claim 16, wherein the processor is further configured to determine the first sequence number based on configuration information.

* * * * *